July 29, 1930.  I. F. KINNARD  1,771,929

INDUCTION WATTHOUR METER

Filed Nov. 29, 1926

Inventor:
Isaac F. Kinnard,
by
His Attorney.

Patented July 29, 1930

1,771,929

UNITED STATES PATENT OFFICE

ISAAC F. KINNARD, OF LYNNFIELD, MASSACHUSETTS, ASSIGNOR TO GENERAL ELECTRIC COMPANY, A CORPORATION OF NEW YORK

INDUCTION WATTHOUR METER

Application filed November 29, 1926. Serial No. 151,292.

My invention relates to electromagnetic devices and more specifically to induction type meter elements such as induction relays, induction watthour meters and induction disc motors. The invention will be explained hereinafter as applied to watthour meters for correcting such meters for errors caused by the damping action of the fluxes on the armature. The invention while particularly applicable to this problem is not limited thereto but may be applied to any electromagnetic device to obtain a limited degree of variation in the relation of the operating flux to the exciting current at different excitations below saturation.

In carrying my invention into effect I utilize the fact that the magnetic material used to make up the magnetic circuit of the device or meter has different permeabilities at different flux densities below the saturation point and I design the magnetic circuit so that it operates over a selected flux density range where the permeability varies materially due to slight changes in density in such a way as to automatically modify the ratio of the energizing current to the operating flux as excitation conditions change. In an electric meter I utilize this feature to compensate for the variable damping of the meter due to changing load conditions. The design of the meter is preferably otherwise modified to take full advantage of the invention.

Figure 2:
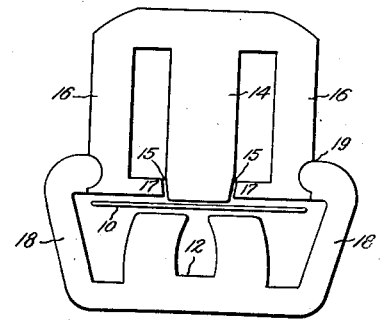
Figure 3:
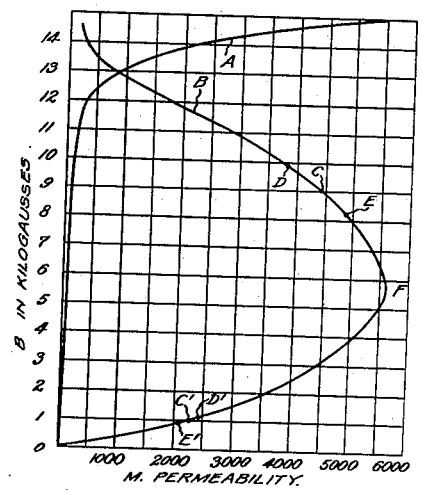
Figure 4:
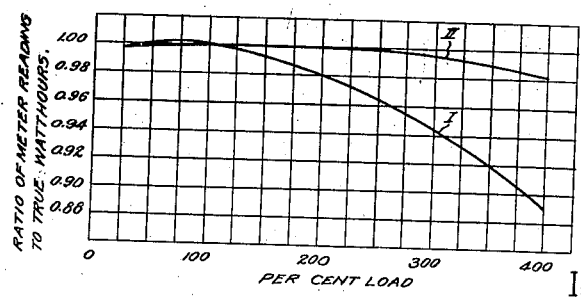

The features of the invention which are believed to be novel and patentable will be pointed out in the claims appended hereto. For a better understanding of the invention, reference is made in the following description to the accompanying drawings in which Fig. 1 indicates the type of meter to which my invention has been applied; Fig. 2 shows a preferred design of the magnetic circuit of such a meter according to my invention; Fig. 3 shows saturation and permeability curves of the magnetic material employed in the magnetic circuit; and Fig. 4 shows load curves which will be referred to in pointing out the improvements effected by my invention when applied to induction watthour meters.

Figure 1:
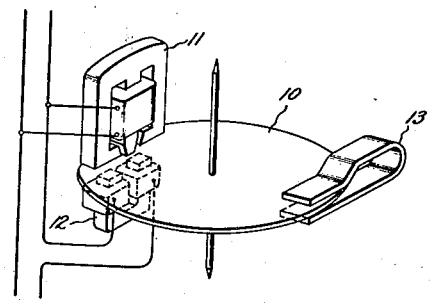

The type of meter to which my invention has been applied in explaining my invention is shown in Fig. 1 and comprises the induction type of integrating wattmeter having a rotatable disc armature 10, an E-shaped potential magnet 11, a U-shaped current magnet 12 and a drag magnet 13. The potential and current magnets have their open ends opposite each other on opposite sides of the disc armature and their fluxes cooperate in the known manner to produce the rotation of the disc by induction motor action. Such meters as heretofore constructed have been subject to errors due to overload conditions. These errors were due to the damping action of the meter fluxes since any flux cutting the disc produces damping as well as motor action. The damping action is proportional to the square of the flux at a given speed while the motor action is proportional to the first power of the flux. While the damping action is only a small percentage of the motor action the fact that the two vary according to different laws has made it difficult to produce a meter with good accuracy over the entire range of load to which the meter is subjected in service. Considering the potential flux of such a meter, it is at once apparent that if the voltage varies the potential flux varies and ordinarily the potential flux cutting the disc varies proportionally. Since the damping action of the flux cutting the disc varies, with variations in the applied voltage according to a different law than the driving action of the same flux, it is seen that the net torque will not vary in direct proportion to the first power of the potential flux but at something less than this, depending upon the magnitude of the damping action. In accordance with my invention I deliberately make the potential flux cutting the disc vary at a greater rate than the first power of the total potential flux to the extent necessary to make the net torque due to the potential flux substantially proportional to the voltage over that range of voltage variation ordinarily met with in practice. This is preferably accomplished by the magnetic circuit design shown in Fig. 2.

The potential coil is wound on the middle leg 14 of the E-shaped potential magnet as is usual as shown in Fig. 1. The potential flux divides at the lower end of the middle leg part crossing the narrow air gaps at 15 and returning to the outer legs 16 of the magnet across the relatively small inwardly projecting members 17. The remainder and the active portion of the potential flux crosses the main air gap through the disc 10 to the poles of the current magnet 12 and returns to the outer legs 16 of the potential magnet through the outer magnetic arms 18 preferably made integral with the laminations of the current magnet and making a good fit with the potential core as shown at 19. I am aware that this general type of magnet structure has been employed before in induction meters, but I am not aware that it has been proportioned to provide the selective flux distribution at different densities as now to be explained.

Referring to the curves of Fig. 3, curve A represents the saturation curve of silicon steel as employed in the laminations of the magnetic circuits of the meter, and B represents the permeability of the same material at different densities. It is seen that the permeability increases to a maximum at a flux density corresponding to about 6 kilogausses and then decreases as the material reaches saturation.

According to my invention the inwardly projecting arms 17 of the potential magnet are proportioned with respect to the other parts of the circuit so that they normally operate on the decreasing permeability part of the curve, such as the point C, corresponding to a flux density of about 9 kilogausses. The other branch circuit of the potential flux, namely the arms 18, are preferably proportioned with respect to the other parts of the circuit so that they normally operate on the increasing permeability part of the curve, such as the point C', corresponding to a flux density of about 1 kilogauss. The air gaps at 15 and the main air gap must also be proportioned correctly to obtain these conditions as well as correctly proportioning the cross-section of parts 17 and 18, although all of these parts may be altered somewhat provided the relation indicated is maintained, namely, point C on the decreasing permeability part of the curve and point C' preferably on the increasing part of the permeability curve. Now it is at once apparent that when the voltage increases above normal and the flux density through both 17 and 18 increases, as indicated by points D and D', curve B of Fig. 3, the path 17 decreases in permeability and the path 18 increases in permeability and as a consequence the ratio of flux taken by the two paths will vary such that a greater proportion passes across the main air gap and a lesser proportion through 17. This reproportioning of the flux due to change in potential can be and preferably is made just enough to make the increase in net torque proportional to the increase in voltage and thus eliminates all potential errors over a considerable range of voltage above and below normal. When the voltage decreases below normal the permeability of 17 increases and that of 18 decreases corresponding to points E and E' so that the ratio of flux distribution is altered in the opposite direction and the meter is compensated for low voltages. Various degrees of compensation may be obtained in this way to suit different meter designs and different grades of steel used in the magnetic circuit. For example, a less degree of compensation may be had by operating the branch 18 over the constant permeability part of the curve at F such that the change in the ratio of flux distribution is due to the changes in permeability of part 17 alone. Nor is it essential that the two parts of the magnetic circuit be made of the same magnetic materials so long as one or both has a section operated at a flux density where the change in permeability due to voltage changes produces a desired change in the flux distribution.

It will now be explained how this feature enables the overload droop due to current overloads to be very materially reduced. Since the meter is compensated for voltage changes, it is evident that the potential flux may be made very much stronger with respect to the current flux than was hitherto possible. This was not feasible in the uncompensated meter because it was necessary to keep the potential flux down in order to suppress the potential damping errors as much as possible. Now, however, the ratio of potential flux to current flux may be made as large as desired without fear of voltage damping errors and as a consequence the current flux may be proportionately reduced to a point where even on heavy current overloads the damping effect of the current flux is negligible in proportion to the torque of the meter. The meter is so designed and accordingly this type of error is negligible on any reasonable overload at which the meter may be operated.

In Fig. 4 I have shown by way of comparison two load accuracy curves. Curve I is a curve plotted from actual test data taken on a standard induction watthour meter of the type shown, as designed prior to my invention. Curve II is a similar curve plotted from actual test data taken on a meter of the same rating, as modified in accordance with my invention. These curves show the remarkable improvement effected in this type of meter by my invention. There is very little difference in the curves up to 100% load although due to the flatness of curve II it approaches more nearly the 100% accuracy line. At 200% load the meter of curve II is exactly correct while the meter of curve I is 2% slow due to the damping effect of the current flux. At 300% load the improved meter is only .4% slow while the unimproved meter is 5½% slow. At 400% load the improved meter is less than 2% slow, whereas the unimproved meter is about 11% slow. The meters were rated at 110 volts, 5 amperes, 60 cycles, and were tested at normal voltage and frequency at varying load currents. Variations in voltage between 90 and 130 volts will not affect the accuracy of the curve II due to the fact that this meter is compensated for potential flux damping. However, this variation in voltage on the uncompensated meter will have a material effect on curve I, making it better or worse depending upon whether the voltage is below or above normal. Such a meter may be operated continuously at 400% load and up to 700% loads momentarily without injury.

The following additional comparison between the two meters will give a more complete idea of the changes made in applying the invention to this particular problem.

The current flux was reduced about 45% in the new meter. The total potential flux of the new meter was reduced about 17%, but the useful potential flux through the main air gap was increased about 70% over that of the old meter. The percentage of the total potential flux utilized in producing torque was increased from about 8% in the old meter to about 18% in the new meter. The main air gap at the center was reduced about 30% and the auxiliary air gap at 15, Fig. 2, was reduced about 50% in the new meter as compared to the old. The ratio of the useful potential flux to the current flux at normal current and voltage in the new meter is approximately 8 to 1 whereas in the old meter it was approximately 5 to 2. The depth of the laminations in both the current and potential cores was reduced somewhat in the new meter. These changes not only eliminated the potential flux damping errors and very materially reduced the current flux damping errors, but they also increase the efficiency of the meter and reduced its weight. These data are given for comparison and not for the purpose of limiting the invention.

In the foregoing I have described how the variation in permeability of magnetic materials below saturation may be taken advantage of for improving induction meters. However, I do not intend to limit my invention thereto since the discovery has a much broader application and may be utilized for improving electromagnetic apparatus generally. In the appended claims I seek patent protection commensurate with the true spirit and scope of my invention.

What I claim as new and desire to secure by Letters Patent of the United States, is,—

1. An electromagnetic device including an electromagnet having parallel magnetic circuits excited by a common energizing winding, one of said circuits conveying an operating flux of the device, said parallel magnetic circuits being so proportioned as to normally operate over selected flux density ranges below saturation, where the permeability characteristics of the materials of which the parallel circuits are made, are caused to vary according to different laws in the parallel circuits in such a manner that the ratio of the applied exciting voltage of said electromagnet to the operating flux in one of the magnetic circuits is caused to vary in a predetermined desired manner with changes in the applied exciting voltage.

2. An induction type meter element having a rotatably mounted armature and an electromagnet for producing an operating flux for said armature, said electromagnet having parallel magnetic circuits, proportioned to normally operate over different flux density ranges below saturation, only one of which produces an operating flux in the armature, said magnetic circuits being so proportioned relative to each other as to substantially compensate the meter element for the damping effect of said operating flux over a given range of flux variation.

3. An induction type meter element having a rotatably mounted armature and an electromagnet for producing an operating flux for said armature, said electromagnet having parallel magnetic circuits, only one of which produces an operating flux in the armature, said magnetic circuits being proportioned to normally operate over selected flux density ranges below saturation such that the permeability characteristics of the materials of which they are made are different to the extent necessary to substantially compensate said meter element for the damping effect of the operating flux over a given range of variation.

4. An induction type meter element having a rotatably mounted armature and an electromagnet for producing an operating flux for said armature, said electromagnet having parallel magnetic circuits, only one of which produces an operating flux in the armature, said last mentioned circuit being proportioned to operate over a selected flux density range below saturation where the ratio of its permeability to flux density varies directly with the flux density and the other magnetic circuit being proportioned to operate over a selected flux density range below saturation where the ratio of its permeability to flux density varies inversely with the flux density to the extent necessary to substantially compensate said meter element for the damping effect of said operating flux over a given range of flux variation.

5. An induction type wattmeter element having an E-shaped voltage magnet with its energizing winding wound on the central leg, and a U-shaped current magnet, the open ends of said two magnets facing each other and separated by an air gap, a rotatably mounted armature in said air gap, magnetic arms extending from the base of the current magnet outside the armature and joining the outer legs of the voltage magnet, magnetic arms extending inwardly from the open ends of the two outer legs of the voltage magnet toward the middle leg and separated therefrom by air gaps appreciably narrower than the first-mentioned air gap, thereby providing two magnetic circuits for the voltage flux of the meter, one circuit through the armature and the other circuit through the inwardly extending arms of the voltage magnet, said two circuits being so proportioned as to operate over different flux density ranges below saturation such that the ratio of the operating voltage flux to the total voltage flux increases with an increase in voltage flux to the extent necessary to substantially compensate the meter for the damping effect of the voltage flux over a given range of variation.

6. An induction type wattmeter element comprising a rotatably mounted armature, a voltage electromagnet and a current electromagnet for producing the operating fluxes for said armature, said voltage electromagnet being compensated to substantially eliminate voltage flux damping errors and the ratio of the normal load voltage operating flux to the normal load current operating flux being greater than four to one so as to materially suppress the current flux damping errors at overloads.

7. An induction type watthour meter having voltage and current electromagnets in which the voltage electromagnet is compensated for voltage flux damping errors and in which the ratio of useful voltage flux to current flux at normal voltage and current is greater than four to one.

8. An induction type watthour meter having voltage and current electromagnets in which the ratio of useful potential flux to current flux at normal voltage and current is approximately eight to one, and means for compensating said meter for voltage flux damping errors.

In witness whereof, I have hereunto set my hand this 24th day of November, 1926.

ISAAC F. KINNARD.